United States Patent [19]

Goyer

[11] 3,829,716

[45] Aug. 13, 1974

[54] WIDE RANGE MONSTABLE MULTIVIBRATOR CIRCUIT HAVING A CONSTANT CURRENT SOURCE

[75] Inventor: Ronald Bruce Goyer, North Hollywood, Calif.

[73] Assignee: RCA Corporation, New York, N.Y.

[22] Filed: Apr. 30, 1973

[21] Appl. No.: 355,445

[30] Foreign Application Priority Data

June 27, 1972 Great Britain .................... 30037/72

[52] U.S. Cl. .................. 307/273, 307/265, 328/207

[51] Int. Cl. ............................................ H03k 3/26

[58] Field of Search ..................... 307/265, 273, 207

[56] References Cited

UNITED STATES PATENTS

| | | | |
|---|---|---|---|
| 3,517,220 | 6/1970 | Gibson et al. | 307/273 |
| 3,436,682 | 4/1969 | Birnbaum | 307/273 |
| 3,452,219 | 6/1969 | Duryee | 307/273 |
| 3,453,453 | 7/1969 | Hughes | 307/273 |
| 3,569,743 | 3/1971 | Baessler | 307/273 |
| 3,584,311 | 6/1971 | Schaffer | 307/273 |

OTHER PUBLICATIONS

"A Converter for Automatic Recording of Mechanical Position", by Kracht, Electronic Engineering, April 1967, pages 250–251.

"A Ten to One Linear Controlled Pulse Width Circuit", by Torresdal Motorola Monitor, Vol. 2, No. 3, 1964, (Library Jan. 1965).

*Primary Examiner*—Stanley D. Miller, Jr.
*Attorney, Agent, or Firm*—Edward J. Norton; Joseph D. Lazar

[57] ABSTRACT

A monostable multivibrator integrated circuit producing an output pulses, whose time duration is normally determined by the combination of a timing resistor and a timing capacitor, is coupled to a constant current circuit which supplies constant current to the timing capacitor thereby considerably expanding the range of output time durations over that normally available. Additionally, the circuit provides for a remotely located time duration adjustment circuit which avoids the problems created by noise pick up on the line connecting the adjustment circuit to the monostable multivibrator circuit.

8 Claims, 1 Drawing Figure

PATENTED AUG 13 1974 3,829,716
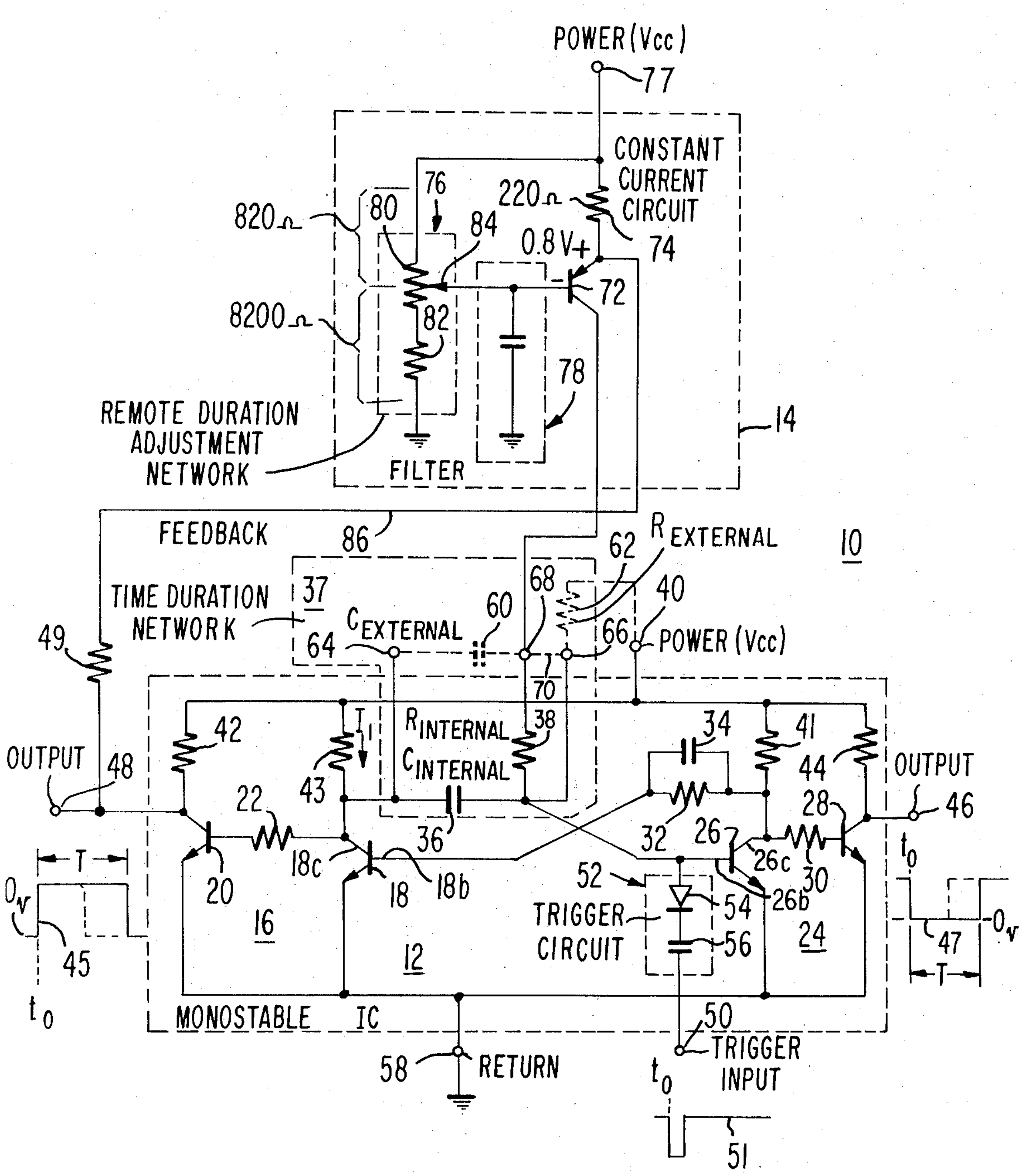

WIDE RANGE MONSTABLE MULTIVIBRATOR CIRCUIT HAVING A CONSTANT CURRENT SOURCE

CROSS REFERENCE TO RELATED APPLICATIONS

Of interest are the following copending patent applications which are assigned to the same assignee as the present patent application: Ser. No. 27,403 filed Apr. 10, 1970, entitled "Separation Control of Aircraft by Non-Synchronous Techniques" based on the invention of Jack Breckman, now about to issue; and patent applications filed on Apr. 30, 1973, entited "Correlator and Control System for Vehicular Collision Avoidance" (Ser. No. 355,448) and "Digital Interface Circuit for a Random Noise Generator" (Ser. No. 355,444) based on inventions of Ronald Bruce Goyer.

BACKGROUND OF THE INVENTION

1. Field of the Invention

The present invention relates in general to the field of monostable multivibrator circuits and in particular to circuits used to control the time duration of the output pulse of monostable multivibrator circuits.

2. Description of the Prior Art

The monostable multivibrator, or as it is alternately known, the one-shot, performs the function of converting an input pulse having one time duration to an output pulse whose leading edge is coincident with that of the input pulse but which has either a shorter or longer time duration. The one-shot resides in one state (stable state) until it is triggered by an input pulse resulting in a change to a second state (quasi-stable state). After some determinable time duration, independent of the input trigger pulse, it returns to its original state.

Monostable multivibrators are known both in discrete form as well as in integrated circuit (IC) packages. Conventional monostable multivibrator integrated circuits usually utilize external timing elements to establish the time duration of the output pulse. Such time duration determining elements comprise resistors and capacitors which are connected to external connection terminals of the monostable multivibrator integrated circuit. Because of the parametric limitations of the integrated circuit, such as the capacitance driving capability and input impedance of the internal transistors, there is a limit on the value of the external time duration determining elements, thereby limiting the range of available time durations of the output pulse.

It is often desirable in applications requiring monostable multivibrators to be able to selectively adjust the duration of the output pulse. Such a selective adjustment feature can be achieved either by arranging for the external capacitor or the external resistor, or both, to be adjustable. Because adjustable or variable resistors in comparison to adjustable or variable capacitors are far more readily available in a wide range of values, and because of their inherent reliability and cheapness, variable resistors are far more frequently utilized than variable capacitors. In many system applications the variable time duration adjustment resistor must be remotely located from the monostable circuit to which it is connected. Such systems often carry high frequency and large voltage signals causing electro-magnetic interference noise to be propagated along the line connecting the time duration adjustment resistor and the monostable multivibrator circuit. This sort of noise can be removed by the use of line filters. However, these filters introduce timing elements such as capacitors and inductors which greatly affect, or even eliminate time duration control by swamping out the selected time duration elements. In addition, for long runs of the connecting wire, large amounts of wiring capacitance may be added to the time duration determining network, thereby causing difficulty in consistently setting the time duration of the output pulse.

SUMMARY OF THE INVENTION

A monostable multivibrator circuit responsive to an input trigger pulse for producing an output pulse whose time duration is in part determined by the charging rate of capacitive means charged by a constant current circuit source.

BRIEF DESCRIPTION OF THE DRAWING

The sole FIGURE is a schematic diagram of a monostable circuit embodying the invention.

DETAILED DESCRIPTION OF A PREFERRED EMBODIMENT

The sole FIGURE is a circuit schematic of a monostable circuit according to the invention useful in extending or contracting the time duration of an input pulse. Monostable multivibrator circuit 10 comprises a constant current source 14 coupled to a suitable monostable integrated circuit 12. A suitable monostable integrated circuit 12 may be an integrated circuit of the type readily available from a number of manufacturers such as Signetics, Fairchild, Motorola, Texas Instrument and RCA. The Signetics version of the monostable circuit is Model No. N8162A; a detailed description of the operating parameters and application of which may be found in the Signetics *DCL Designer's Choice Logic Specifications Handbook*, Volume 1, Logic Elements, on pages 2—2 and 4–11 respectively. Block 12 is a simplified version of a monostable integrated circuit commonly found in the industry as exemplified by the Signetics integrated circuit. It will be appreciated that although a collector-coupled type monostable multivibrator is to be described herein, other types of monostable multivibrators such as emitter-coupled type monostable multivibrators may also be used in practicing the invention.

Monostable multivibrator circuit 12 is formed of two cross coupled amplifier stages 16 and 24. Amplifier stage 16 comprises NPN transistors 18 and 20; the base of transistor 20 being resistively coupled to the collector of transistor 18 by resistor 22. Transistor 20 performs the function of inverting a voltage signal established at the collector of transistor 18. Amplification stage 24 comprises NPN transistors 26 and 28; the collector of transistor 26 being resistively coupled to the base of transistor 28 by resistor 30. Transistor 28 performs the function of inverting a voltage signal established at the collector of transistor 26. The collector of transistor 20 is coupled to supply voltage $V_{cc}$, made available at terminal 40, via load resistor 42 while its emitter is connected to the circuit's return terminal 58. The collector of transistor 28 is coupled to supply voltage $V_{cc}$ by load resistor 44 while its emitter is connected to the circuit's return via terminal 58.

Transistors 18 and 26 are arranged in a cross-coupled configuration. Base 18*b* of transistor 18 is coupled to collector 26*c* of transistor 26 through resistor 32. A capacitor 34 is connected across resistor 32 and functions to discharge the base-emitter voltage of transistor 18 during switching operations in a manner well known in the art. Collector 26*c* of transistor 26 is resistively coupled to supply voltage $V_{cc}$, made available at terminal 40, through load resistor 41. Base 26*b* of transistor 26 is coupled to collector 18*c* of transistor 18 through capacitor 36 which is included in time duration network 37. Time duration network includes capacitor 36 and resistor 38, included within monostable integrated circuit 12, and capacitor 60 and resistor 62, provided externally to monostable integrated circuit 12, to control, in part, the time duration of output pulse of monostable circuit 10. Collector 18*c* is coupled to supply voltage $V_{cc}$ by load resistor 43. Internal timing resistor 38 is connected at one end to capacitor 36 and to base 26*b* of transistor 26. The other end of internal time resistor 38 is connected to connection terminal 68 which is external to monostable integrated circuit 12. Connection terminals 64 and 66, also external to monostable integrated circuit 12, are directly connected to opposite ends of internal timing capacitor 36. As will be seen external connection terminals 64, 66, and 68 are circuit access points by which time duration network 37 may be modified as desired. The emitters of transistors 18, 20, 26 and 28 are connected to circuit return, in this case, ground, through return terminal 58.

In addition to performing the function of inversion, as was previously indicated, transistors 20 and 28 function to buffer integrated circuit 12 from any of a variety of circuits which may be connected to output terminals 46 and 48 to utilize the output signals generated, respectively, at output terminals 46 and 48. Output terminal 46 is connected to the collector of transistor 28 while complementary output terminal 48 is connected to the collector of transistor 20. For the present description, the output voltage 47 generated at terminal 46 will be said to be the positive output in that a voltage at this terminal will change in the same sense as an input voltage received by monostable multivibrator 12 at trigger input terminal 50. An output voltage 45 generated at terminal 48 will have the same time duration (T) as the positive output voltage generated at output terminal 46, but, will be the complement of the positive output voltage 47. Thus output voltage 45 will be the inverse of output voltage 47.

Trigger input signal 51 is applied to trigger input terminal 50 which is coupled to base 26*b* through a trigger circuit 52 comprising the series connection of diode 54 and capacitor 56. Capacitor 56 insures that the input trigger signal coupled to base 26*b* does not contain any DC components. Diode 54 insures that only voltages below that of the return potential, in this case ground potential, reach base 26*b*.

External timing capacitor 60 is connected between external connection terminals 64 and 68. External timing resistor 62 is connected between supply voltage $V_{cc}$, made available at terminal 40, and external connection terminal 66. When external timing resistor 62 is used, internal timing resistor 38 is not used and is either bypassed by a connection indicated by phantom (dotted) line 70 between external connection terminals 66 and 68 or its external connection terminal 68 is merely left disconnected. It is noted, however, that it is preferred to bypass internal timing resistor 38 to deviate the inherent sensitivity of an open termination to noise. With internal timing resistor 38 bypassed, internal timing capacitor 36 and external timing capacitor 60 are connected in parallel and the value of the effective timing capacitance of time duration network 37 is the sum of the values of internal timing capacitor 36 and external timing capacitor 60. Alternatively, external timing resistor 62 may be connected in series with internal timing resistor 38 thereby making the value of the effective timing resistor the sum of the values of external timing resistor 62 and internal timing resistor 38.

Constant current circuit 14 supplies a constant current through conductor 15 to external connection terminal 68 of time duration network 37. Constant current circuit 14 includes a constant current path ormed by the series connection of current determining resistor 74 and the emitter-collector conduction path of PNP transistor 72 connected between power supply terminal 77 and external connection terminal 68 of time duration network 37. Whatever the configuration of time duration network 37, the collector of transistor 72 should be coupled to time duration network 37 so that the constant current charges the effective timing capacitor (36/60). The base of transistor 72 is connected to a duration adjustment circuit 76 which is formed of a resistive voltage divider circuit.

As previously indicated in some system applications duration adjustment circuit 76 may be located a considerable distance away from the monostable circuitry 12 requiring long leads between adjustment circuit 76 and monostable circuit 12. Such long leads are susceptible to electro-magnetic noise pick up which may adversely affect the operation of monostable integrated circuit 12. To eliminate such noise, a suitable filter 78 may be added to the line coupling remote duration adjustment 76 and monostable circuit 12. It should be noted that, without the buffering action of transistor 72, the interposition of filter 78 between remote adjustment network 76 and monostable circuit 12 would affect the time constant of time duration network 37. Filter 78 may be formed of a capacitor or any other suitable noise filter circuit, such as an R-C or L-C circuit.

Remote duration adjustment network 76 comprises a series resistance path formed of variable resistor 80 and Fixed resistor 82 connected between power terminal 77 and the circuit return (ground). It should be noted that although as shown power terminal 77 and 40 are both connected to the same source of potential, namely $V_{cc}$, terminal 77 and 40 may be connected to separate sources of suitable potential.

Tap arm 84 of resistor 80 is controllably adjusted to provide a suitable voltage to cause the conduction of transistor 72 to the base of transistor 72 through filter 78. The voltage across the top resistive portion of the voltage divider is applied across the current determining resistor 74 through the base-emitter junction of transistor 72 which reduces the voltage by a few tenths of a volt depending on the type of transistor utilized. The voltage across resistor 74 and the value of resistor 74 determine the magnitude of the constant charging current which is applied to time duration network 37 through conductor 15.

A feedback path 86, including feedback resistor 49, couples complementary output signal 45 established at the collector of transistor 20 (output terminal 48) to the emitter of transistor 72. As will be seen, the series path comprising load resistor 42 and feedback path 86 is provided to increase the constant charging current supplied to the effective timing capacitance (36, 60) during time duration T of output signals 45 and 49. In addition, as will be seen, feedback path 86 preconditions monostable circuit 12 during its stable state so that it may be readily triggered into its quasi-stable state upon the reception of trigger signal 51 at trigger input terminal 50.

The following is a brief description of the operation of monostable multivibrator circuit 12 without the application of the constant current source circuit 14. Detailed description of the operation of monostable multivibrator circuits can be found in chapter 11, "Monostable and Astable Multivibrators," of *Pulse, Digital and Switching Waveforms* by Millman and Taub, McGraw-Hill Book Company, 1965.

As is well known in the art a monostable circuit has only one permanently stable state and one quasi-stable state in the operation of which a triggering signal is required to induce a transition from the stable state to the quasi-stable state. The circuit may remain in its quasi-stable state for a time duration which is long or short in comparison with the time of transition between states and the pulse width of the input trigger signal. Eventually, however, the circuit will return from the quasi-stable state to the stable state, no external signal being required to induce this reverse transition.

Initially it will be assumed that monostable multivibrator 12 is in its (permanently) stable state with transistor 18 OFF and transistor 26 ON, i.e., in its saturated state. Monostable multivibrator 12 may be induced to make a transition out of its stable state by an application of a negative trigger signal 51 at base **26*b* of transistor 26 or at collector 18*c* of transistor 18. Capacitor 56 and diode 54 of trigger circuit 52 couple negative trigger signal 51 to the base of transistor 26 as previously described. It is to be noted that the triggering action is unsymmetrical, being applied to one transistor (26) only and not to both (18 and 26**) simultaneously.

When negative going trigger signal 51 is applied to the base of transistor 26 through trigger circuit 52 a regenerative action takes place driving transistor 26 completely into a cut-off condition. The voltage at collector **26*c* of transistor 26 now rises to approximately $V_{cc}$, and, because of the cross coupling between the collector of transistor 26 and the base of transistor 18, transistor 18 conducts. Transistor 18 may be driven into saturation, or it may operate within its active region depending upon the magnitude of the voltage established at collector 26*c*. Whether transistor 18 is insaturate or operates within its active region a current $I_1$ now flows through load resistor 43 and the voltage at the collector of transistor 18 drops abruptly by an amount equal to the product of $I_1$ and the ohmic value of resistor 43. The voltage at base 26*b* drops by the same amount because the voltage across timing capacitors 36 and 60 cannot change instantaneously thereby driving transistor 26 further into cut-off. Multivibrator 12** is now in its quasi-stable state.

Circuit 12 will remain in this quasi-stable state for only a finite time duration T because base **26*b* of transistor 26 is connected to the junction (terminal 66) of the parallel combination of timing capacitors 36 and 60 and timing resistor 62. During the quasi-stable state transistor 18 conducts thereby completing a path through which current may flow from power terminal 40 ($+V_{cc}$) through timing resistor 62 to charge timing capacitors 36 and 60. As timing capacitors 36 and 60 become charged the voltage at base 26*b* of transistor 26 will rise exponentially and when the voltage passes the cutin voltage of the base-emitter junction of transistor 26 turning transistor 26 ON and initiating a regenerative action turning transistor 18 OFF and eventually returning multivibrator 12** to its initial stable state.

During the above-described voltage transistions, it should be noted that the voltage 45 at the collector of transistor 20 (output terminal 48) is the complement of the voltage at collector **18*c* of transistor 18 while the voltage 47 at the collector of transistor 28 (output terminal 46) is the complement of the voltage at collector 26*c* of transistor 26 because transistors 20 and 28 act as inverters as well as buffer stages for transistors 18 and 26** respectively.

Typically, the duration time T is directly proportional to the time constant, $\tau$, of the circuit's time duration network 37 while transistor is conducting current. In monostable circuit 12, time constant $\tau$ of time duration network 37 approximately equals:

$$(C_{EXTERNAL} + C_{INTERNAL}) \times (R_{EXTERNAL}) \quad (1)$$

With internal timing resistor 38 bypassed, internal timing capacitor 36 is typically very small in comparison to selected external timing capacitor 60 and may therefore be neglected.

The internal parameters of a typical commercial form of monostable circuit 12 place constraints on the selection of external timing resistor 62. For instance, if external timing resistor 62 is made small in comparison to the impedance of trigger circuit 52 in order to increase the charging current flowing therethrough to external capacitor 60 and thereby decrease time duration T in accordance with equation 1, transistor 26 will be too deeply saturated during the stable state of monostable circuit 12 and trigger signal 51 will not be able to trigger monostable circuit 12 into its quasi-stable state. Further, there is an upper limit on the selection of external resistor 62 which limit is set by the minimum base current required by transistor 26.

It will now be shown that a considerable gain in the range of pulse width over that previously attainable from a conventional monostable multivibrator (such as circuit 12) can be achieved with the addition of constant current circuit 14 and feedback path 86.

In operation, transistor 72 is biased to operate in its active region. A voltage is established at the base of transistor 72 by the voltage division action of remote duration adjustment circuit 76. The difference between power supply voltage $V_{cc}$ and the voltage established at the base of transistor 72, less the base-emitter junction voltage drop of transistor 72, is established across current determining resistor 74. The voltage across resistor 74 and the value of resistor 74, of course, determine the current flowing therethrough. It is to be noted that during the quasi-stable state of multivibrator 12, corresponding to time duration during which transistor 20 is OFF, the current flowing through current determining resistor 74 to the emitter of transistor 72 is supplemented by the current flowing through the series path formed by feedback path 86 and lead resistor 42 from power supply terminal 40 to further increase the charging current from circuit 14. Since the base current of transistor 72 is typically small as compared to the emitter current of transistor 72, the current flowing through the collector of transistor 72 is substantially the same as the current flowing through resistor 74. The constant current flows through the parallel combination of timing capacitors 36 and 60 and establishes together with external timing resistor 62, the time required to charge capacitors 36 and 60 to a voltage at which transistor 26 will again turn ON.

While monostable circuit 12 is in its stable state, before the application of trigger signal 51 to trigger input terminal 50, a substantial portion of the constant current available from constant current supply circuit 14 is diverted away from base **26*b* of transistor 26 so that monostable circuit 12 is readily triggered upon the application of trigger signal 51 to trigger input terminal 50. If the current flowing to base 26*b* of transistor 26 from constant current circuit 14 was not reduced during the period of stable operation of monostable circuit 12 transistor 26 would be biased deeply into saturation thereby making triggering difficult. While monostable circuit 12 is in its stable state the voltage established at output terminal 48 is near ground potential and current flowing through current determining resistor 74 is diverted away from the emitter of transistor 72 and flows through feedback path 86 and the collector-emitter conduction path of transistor 20 to return terminal 58 thereby reducing the constant current flow to base 26*b* of transistor 26.**

It can be shown that the constant charging current available from a constant current circuit utilizing typical circuit parameter values is approximately 25 times that available from the use of an external timing resistor suitably selected to coact with a monostable multivibrator integrated circuit uch as the Signetics N81624. For example, if external timing resistor 62 has a value of 12 Kohms and the magnitude of $V_{cc}$ is 5 volts DC, the maximum charging current available to external capacitor 60 is 5vdc/12Kohms or, approximately 0.42 milliamperes. With typical resistance values as indicated in constant current circuit 14 and with the base emitter junction voltage drop of transistor 72 being assumed to be 0.8 volts DC, the maximum constant charging current available from constant current circuit 14 is:

5vdc − [(5vdc 820 ohms/1820 ohms) + 0.8 vdc]/220 ohms = 8.9 milliamperes.

The maximum constant current available from constant current circuit 14 is therefore approximately 25 times the charging current which is available through external timing resistor 62. In addition, as previously explained, feedback path 86 provides for additional charging current during the quasi-stable state of monostable circuit 12.

It should now be apparent that the larger the charging current the smaller the time duration of output pulses (45 and 47) and the smaller the charging current the smaller the time duration of the output pulse. Therefore, external timing resistor 62 can be selected within the constraints previously set forth to supply a relatively small current to charge the effective timing capacitance of time duration network 37 to control the maximum time duration of output pulses 45 and 47, whereas, constant current circuit 14 can be adjusted to supply a relatively large constant current to control the minimum time duration of output pulses 45 and 47. In this manner, therefore, constant current circuit 14 considerably increases the range of output pulse durations available from monostable integrated circuit 12 beyond that otherwise available without its use. In addition, as was previously explained, monostable multivibrator circuit 10 has provisions for a remotely located time duration adjustment network 76 which avoids the problems associated with undesirable noise pickup on the lines connecting a remotely located time duration network with time duration network 37. Without the buffering action of transistor 72, a filter circuit added to filter noise from the path coupling remotely located adjustment circuit 76 and time duration network 37 would adversely affect the time constant of time duration network 37.

What is claimed is:

1. A circuit comprising:

monostable multivibrator means having a stable state manifested by a first output level and a quasi-stable state manifested by a second output level, said monostable multivibrator means including capacitive means charging substantially throughout said quasi-stable state, said monostable multivibrator means normally operating in said stable state, said multivibrator means switching to said quasi-stable state in response to an input signal and returning to said stable state in response to a predetermined level developed by said capacitive means as it charges, the time duration of said quasi-stable state being substantially equal to the time period required to charge said capacitive means to said predetermined level;

resistive means coupled between a source of fixed potential and said capacitive means for supplying a current to charge said capacitive means, said resistive means supplying a current to control the maximum time duration of said quasi-stable state;

means for supplying a constant current to said capacitive means to charge said capacitive means, said means for supplying said constant current supplying a constant current to control the minimum time duration of said quasi-stable state, said means for supplying said constant current including a semiconductor device having first and second electrodes defining the ends of a conduction path and a control electrode for controlling the conduction of said conduction path, a circuit point for applying a fixed potential to said circuit, a constant current path coupling said circuit point to said capacitive means and including, in the order named, a current determining resistor and said conduction path between said first electrode and said second electrode, and means for applying a potential to said control electrode; and a feedback path coupled between said monostable multivibrator circuit and said first electrode for coupling said first output level to said first electrode to reduce said constant current substantially throughout said stable state and for coupling said second output level to said first electrode to increase said constant current substantially throughout said quasi-stable state.

2. The circuit recited in claim 1 wherein said means for applying a potential to said control electrode includes a voltage divider circuit having a tap off point coupled to said control electrode.

3. The circuit recited in claim 2 wherein said voltage divider circuit is adjustable to change the level of potential applied to said control electrode.

4. The circuit recited in claim 3 wherein said control electrode is coupled to means for filtering noise signals present at said control electrode.

5. A circuit comprising:

monostable multivibrator means having a stable state manifested by a first output level and a quasi-stable state manifested by a second output level, said monostable multivibrator means including capacitive means charging substantially throughout said quasi-stable state, said monostable multivibrator means normally operating in said stable state, said multivibrator means switching to said quasi-stable state in response to an input signal and returning to said stable state in response to a predetermined level developed by said capacitive means as it charges, the time duration of said quasi-stable state being substantially equal to the time period required to charge said capacitive means to said predetermined level;

resistive means coupled between a source of fixed potential and said capacitive means for supplying a current to charge said capacitive means, said resistive means supplying a current to control the maximum time duration of said quasi-stable state;

a semiconductor device having first and second electrodes defining the ends of a conduction path and a control electrode for controlling the conduction of said conduction path;

means for applying a fixed potential to said circuit;

a constant current path for supplying a constant current to said capacitive means to charge said capacitive means, said constant current path being coupled between said means for applying a fixed potential and said capacitive means and including, in the order named, a current determining resistor and said conduction path between said first and second electrodes;

a voltage divider circuit having an adjustable tap off point;

a filter coupling said tap off point to said control electrode for establishing a voltage across said current determining resistor to thereby control said constant current, said constant current being controlled to control the minimum time duration of said quasi-stable state; and feedback means coupled between said monostable multivibrator circuit and said first electrode for coupling said first output level to said first electrode to reduce said constant current substantially throughout said stable state and for coupling said second output level to said first electrode means to increase said constant current substantially throughout said quasi-stable state.

6. The circuit comprising:

monostable multivibrator means having a stable state manifested by a first output level and a quasi-stable state manifested by a second output level, said monostable multivibrator means including capacitive means charging substantially throughout said quasi-stable state, said monostable multivibrator means normally operating in said stable state, said multivibrator means switching to said quasi-stable state in response to an input signal and returning to said stable state in response to a predetermined level developed by said capacitive means as it charges, the time duration of said quasi-stable state being substantially equal to the time period required to charge said capacitive means to said predetermined level;

resistive means coupled between a source of fixed potential and said capacitive means for supplying a current to charge said capacitive means, said resistive means supplying a current to control the maximum time duration of said quasi-stable state;

constant current source means coupled to said capacitive means for supplying a constant current to said capacitive means to charge said capacitive means, said constant current source means supplying a constant current to control the minimum time duration of said quasi-stable state; and feedback means coupled between said monostable multivibrator circuit and said constant current source means for coupling said first output level to said constant current source means to reduce said constant current substantially throughout said stable state and for coupling said second output level to said constant current source means to increase said constant current substantially throughout said quasi-stable state.

7. The circuit recited in claim 6 wherein said constant current source means includes adjustable means for varying said constant current supplied to said capacitive means and buffering means for isolating said monostable multivibrator means from said adjustable means.

8. The circuit recited in claim 7 wherein filter means is coupled between said adjustable means and said buffering means for filtering electronic noise present between said adjustable means and said buffering means.

* * * * *